(12) United States Patent (10) Patent No.: US 9,774,747 B2
Garland et al. (45) Date of Patent: Sep. 26, 2017

(54) TRANSCRIPTION SYSTEM

(75) Inventors: Jacob B. Garland, Marietta, GA (US); Marsal Gavalda, Sandy Springs, GA (US)

(73) Assignee: NEXIDIA INC., Atlanta, GA (US)

( * ) Notice: Subject to any disclaimer, the term of this patent is extended or adjusted under 35 U.S.C. 154(b) by 1368 days.

(21) Appl. No.: 13/097,875

(22) Filed: Apr. 29, 2011

(65) Prior Publication Data

US 2012/0278071 A1 Nov. 1, 2012

(51) Int. Cl.
*G10L 15/00* (2013.01)
*H04M 11/10* (2006.01)
*G10L 21/00* (2013.01)
*G10L 13/00* (2006.01)
*G06F 17/20* (2006.01)
*G06F 3/16* (2006.01)
*G06F 3/00* (2006.01)
*G06F 7/00* (2006.01)
*G11B 19/00* (2006.01)
*H04N 7/16* (2011.01)
*H04M 1/64* (2006.01)
*G10L 15/08* (2006.01)
*G10L 15/26* (2006.01)

(52) U.S. Cl.
CPC .............. *H04M 11/10* (2013.01); *G10L 15/26* (2013.01); *G10L 2015/088* (2013.01)

(58) Field of Classification Search
USPC ....... 704/235, 234, 9, 260, 275, 211, 236, 1; 707/750; 715/704, 728; 379/88.01; 369/25.01; 725/1
See application file for complete search history.

(56) References Cited

U.S. PATENT DOCUMENTS

| | | | | |
|---|---|---|---|---|
| 4,908,866 | A * | 3/1990 | Goldwasser | G11B 15/087 369/25.01 |
| 6,260,011 | B1* | 7/2001 | Heckerman et al. | 704/235 |
| 6,282,510 | B1* | 8/2001 | Bennett | G06F 17/24 348/E7.081 |
| 6,490,553 | B2* | 12/2002 | Van Thong | H04N 5/278 348/E5.06 |
| 6,816,858 | B1* | 11/2004 | Coden et al. | 707/750 |
| 6,952,673 | B2* | 10/2005 | Amir et al. | 704/235 |
| 7,010,489 | B1* | 3/2006 | Lewis | G10L 13/10 704/258 |
| 7,263,484 | B1 | 8/2007 | Cardillo et al. | |
| 7,487,086 | B2* | 2/2009 | Griggs | 704/235 |
| 7,613,610 | B1* | 11/2009 | Zimmerman | G06Q 50/22 379/88.01 |
| 9,099,088 | B2* | 8/2015 | Washio | G10L 25/48 |
| 2002/0143534 | A1* | 10/2002 | Hol | G10L 15/22 704/235 |
| 2002/0163533 | A1* | 11/2002 | Trovato | G10H 1/368 715/728 |

(Continued)

*Primary Examiner* — Neeraj Sharma
(74) *Attorney, Agent, or Firm* — Pearl Cohen Zedek Latzer Baratz LLP

(57) ABSTRACT

A transcription system automates the control of the playback of the audio to accommodate the user's ability to transcribe the words spoken. In some examples, a delay between playback and typed input is estimated by processing the typed words using a wordspotting approach. The estimated delay is used as in input to an automated speed control, for example, to maintain a target or maximum delay between playback and typed input.

15 Claims, 6 Drawing Sheets

(56) References Cited

U.S. PATENT DOCUMENTS

| | | | |
|---|---|---|---|
| 2004/0111265 A1* | 6/2004 | Forbes | G10L 15/26 704/260 |
| 2004/0138894 A1* | 7/2004 | Kiecza | G10L 15/28 704/277 |
| 2006/0026003 A1* | 2/2006 | Carus et al. | 704/275 |
| 2006/0265208 A1* | 11/2006 | Assadollahi | 704/9 |
| 2008/0195370 A1* | 8/2008 | Neubacher | G10L 15/26 704/1 |
| 2009/0083036 A1* | 3/2009 | Zhao et al. | 704/260 |
| 2009/0319265 A1* | 12/2009 | Wittenstein | G10L 15/26 704/234 |
| 2010/0063815 A1* | 3/2010 | Cloran et al. | 704/235 |
| 2010/0179811 A1* | 7/2010 | Gupta | G10L 15/22 704/235 |
| 2011/0154197 A1* | 6/2011 | Hawthorne et al. | 715/704 |

* cited by examiner

TRANSCRIPTION SYSTEM

BACKGROUND

This invention relates to a system for transcription of audio recordings.

Manual transcription is often performed by a user listening to an audio recording while typing the words heard in the recording with relatively low delay. Generally, the user can control the audio playback, for example, using a foot control that can pause and rewind the audio playback. Some playback devices also enable control of the playback rate, for example, allowing slowdown or speedup by factors of up to 2 or 3 while maintaining appropriate pitch of recorded voices. The operator can therefore manually control playback to accommodate the rate at which they are able to perceive and type the words they hear. For example, they may slow down or pause the playback in passages that are difficult to understand (e.g., noisy recordings, complex technical terms, etc.), while they may speed up sections where there are long silent pauses or the recorded speaker was speaking very slowly.

SUMMARY

In one aspect, in general, a transcription system automates the control of the playback of the audio to accommodate the user's ability to transcribe the words spoken. In some examples, a delay between playback and typed input is estimated by processing the typed words using a wordspotting approach. The estimated delay is used as in input to an automated speed control, for example, to maintain a target or maximum delay between playback and typed input.

In an aspect, in general, a transcription system includes a controllable playback unit for playing an audio recording to a user and a keyboard unit which includes an input device for accepting word input from a user. The keyboard unit is coupled to the audio player to accept a time reference from the player. A word spotter is configured to receive words from the keyboard unit and estimate corresponding audio times of the words in the audio recording. A playback control unit configured to control the playback unit according to the estimated audio times of the words accepted from the user.

Aspects may include one or more of the following features.

The playback control unit may be configured to maintain a target delay between playback of words in the audio recording and the time the words are accepted for the user.

In another aspect, in general, a method for controlling a transcription system includes playing an audio recording to a user at a controlled rate, accepting transcription of the audio recording from the user, determining a correspondence of the accepted transcription and the audio recording, and controlling a rate of playback according to the determined correspondence.

Aspects may include one or more of the following features.

Accepting the transcription may include accepting transcribed words, and determining the correspondence may include locating the words in the audio recording. Locating the words may include applying a wordspotting approach. Applying the wordspotting approach may include using a stored phonetic processing of the audio recording determined prior to the playing of the recording. Controlling the rate of playback may include determining a delay between a playback time of words and corresponding transcription times of the words. Controlling the rate of playback may include applying a feedback approach based on the determined delay to approach a target delay.

Controlling the rate of playback may include at least one of pausing the playback and rewinding the playback according to the determined delay. The method may also include providing a predicted transcription to the user based on a speech recognition of following audio in an interval following a recording time corresponding to a transcription input from the user. Providing the prediction may include predicting words from the transcription, and determining whether the words are present in the following audio. Determining whether the words are present may include applying a wordspotting approach. Providing the prediction may include providing multiple alternative predictions for selection by the user.

The method may also include providing a graphical representation of the predicted transcription to the user and updating the graphical representation based on the determination of whether the words are present in the following audio.

In another aspect, in general, a transcription system includes a storage for an audio recording, a transcription entry unit for accepting word input from a user, and determining a time of occurrence of the words in the audio recording, and a text prediction unit responsive to previously entered words and recorded audio configured to determined predicted words for transcription based on both the entered words and the recorded audio.

In another aspect, in general, a transcription method includes playing an audio recording to a user at a controlled rate, accepting transcription of the audio recording from the user, determining a correspondence of the accepted transcription and the audio recording, and providing a predicted transcription to the user based on a speech recognition of the audio recording following times corresponding to the accepted transcription.

Aspects may include one or more of the following features.

Accepting the transcription may include accepting transcribed words, and determining the correspondence may include locating the words in the audio recording. Locating the words may include applying a wordspotting approach. Providing the prediction may include predicting words from the transcription, and determining whether the words are present in the following audio. Determining whether the words are present may include applying a wordspotting approach. Providing the prediction may include providing multiple alternative predictions for selection by the user.

In another aspect, in general, a transcription method includes accepting recorded media for transcription, providing a graphical representation of the recorded media for transcription, accepting a transcription of the recorded media from a user, the transcription including a plurality of transcription elements, and updating the graphical representation of the recorded media based on the accepted transcription including updating future occurrences of the accepted transcription elements.

Aspects may include one or more of the following features.

The recorded media may include an audio recording and a video recording. The transcription elements may be spoken words included in the audio recording. The transcription elements may be the faces of people in the video recording. The recorded media may include an audio recording. The transcription elements may be spoken words included in the audio recording. The graphical representation of the recorded media may be a template. The graphical representation may include placeholders for words.

The graphical representation may include placeholders for music. The graphical representation may include indicators of a change from one speaker to a different speaker. The template may include a plurality of elements and at least some of the plurality of elements may include editable metadata. The metadata may include a name of a speaker. The metadata may include a name of a piece of music. The graphical representation may include one or more indications of transcription completeness. The graphical representation may include one or more indications of transcription quality.

The method may include automatically populating at least some of the graphical representation for recorded media with transcription elements. Automatically populating at least some of the graphical representation may include applying a wordspotting approach. Updating the graphical representation of the recorded media may include detecting erroneous transcription elements included in the accepted transcription.

Other features and advantages of the invention are apparent from the following description, and from the claims.

DESCRIPTION

Figure 1:
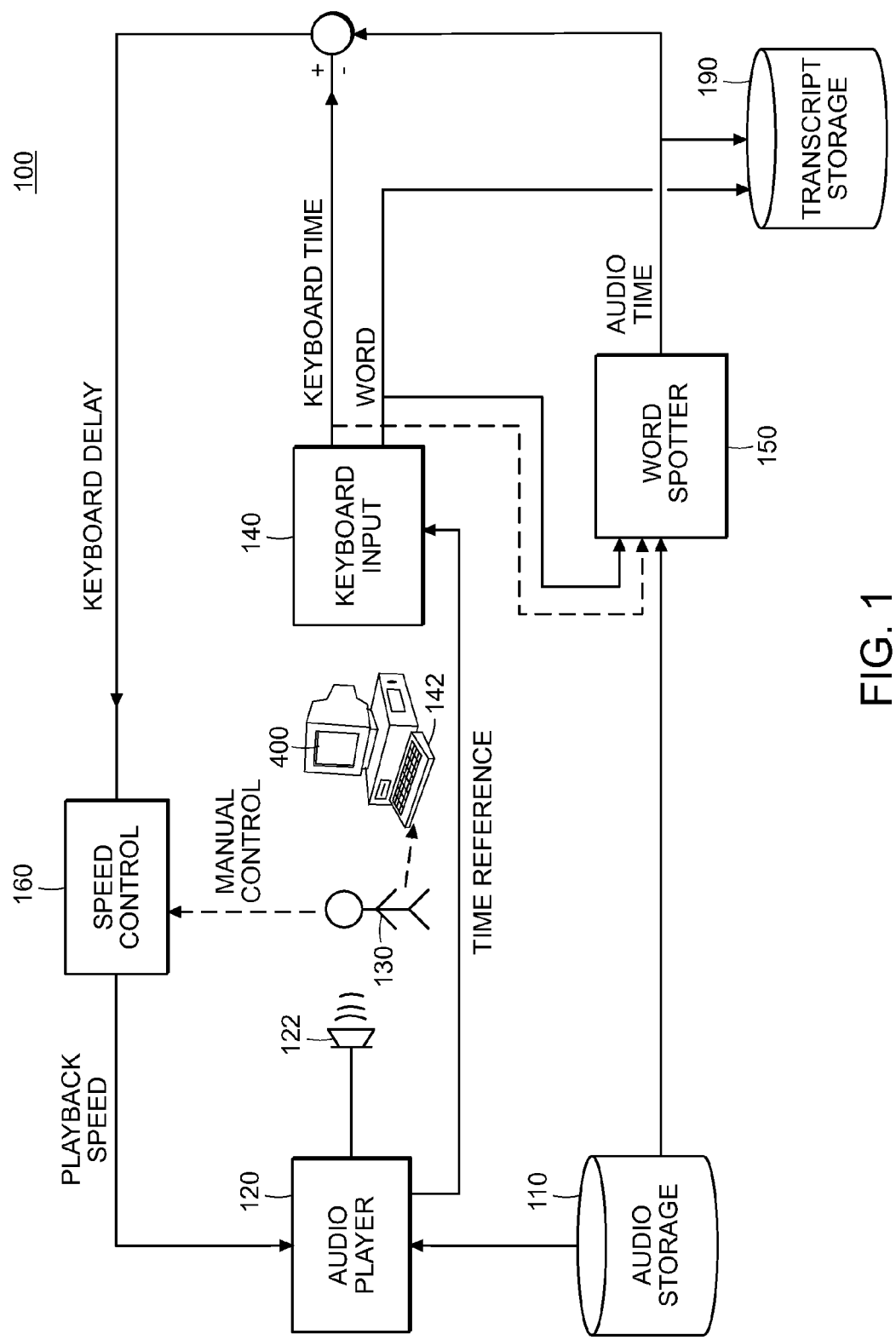
FIG. 1 is a block diagram of a transcription system.

Referring to FIG. 1, a transcription system 100 provides a way of processing an audio recording stored in an audio storage 110 to produce a time referenced transcription stored in a transcription storage 190. The transcription is time referenced in that all (or most) of the words in the transcription are tagged with their time (e.g., start time, time interval) in the original recording. The system makes use of a user 130, who listens to the recording output from an audio player 120 (e.g., over a speaker or headphones 122) and enters a word-by-word transcription of what they hear into a keyboard input unit 140 (e.g., via a keyboard 142). In some examples, an optional graphical user interface 400 provides feedback to the user 130 for the purpose of improving the efficiency and quality of the transcription.

The keyboard input unit 140 receives a time reference from the audio player 120 so that as a word is entered by the user, the keyboard time of that entry in the time reference of the audio recording is output in association with each word that is typed by the user. The sequence of words typed by the user form the text transcription of the recording.

Generally, when the user types a word, that word was recently played by the audio player. Therefore, the keyboard time generally lags the audio play time by less than a few seconds. A precise audio time for each typed word is determined by passing the typed word (and optionally the keyboard time) to a word spotter 150, which processes a trailing window of the audio playback to locate the word. Generally the word is found (unless the user made a typing error or extraneous text was output), and the detected audio time is stored along with the typed word in the transcription storage.

The difference between the keyboard time and the earlier audio time represents the typing delay by the user. For example, if the user has difficulty in understanding or typing the words he hears, one might expect the delay to increase. In conventional transcription systems, the user may pause or even rewind the recording until he catches up. In the system 100 shown in FIG. 1, the keyboard delay is passed to a speed control 160, which adapts the playback speed to maintain a desired delay in a feedback approach. In this way, as the user slows down his typing, the playback naturally slows down as well without requiring manual intervention. Without having to control the player, the user may achieve a higher overall transcription rate.

In some examples, the user maintains the ability to manually control the audio playback. In some examples, they can also control a target or maximum delay. Furthermore, in some examples, the manual control makes use of the estimated audio times of previously transcribed words allowing the user to rewind a desired number of words, for example, to review and/or retype a section of the recording.

In some examples, the wordspotting procedure makes use of a technique described in U.S. Pat. No. 7,263,484, titled "Phonetic Searching," which is incorporated herein by reference. The audio recording is processed to form a "PAT" file (which may be precomputed and stored with the audio recording), which includes information regarding the phonetic content at each time of the recording, for example, as a vector of phoneme probabilities every 15 ms. When transcribed words are entered by the user, they are compared against the PAT file to locate the spoken time.

Figure 2:
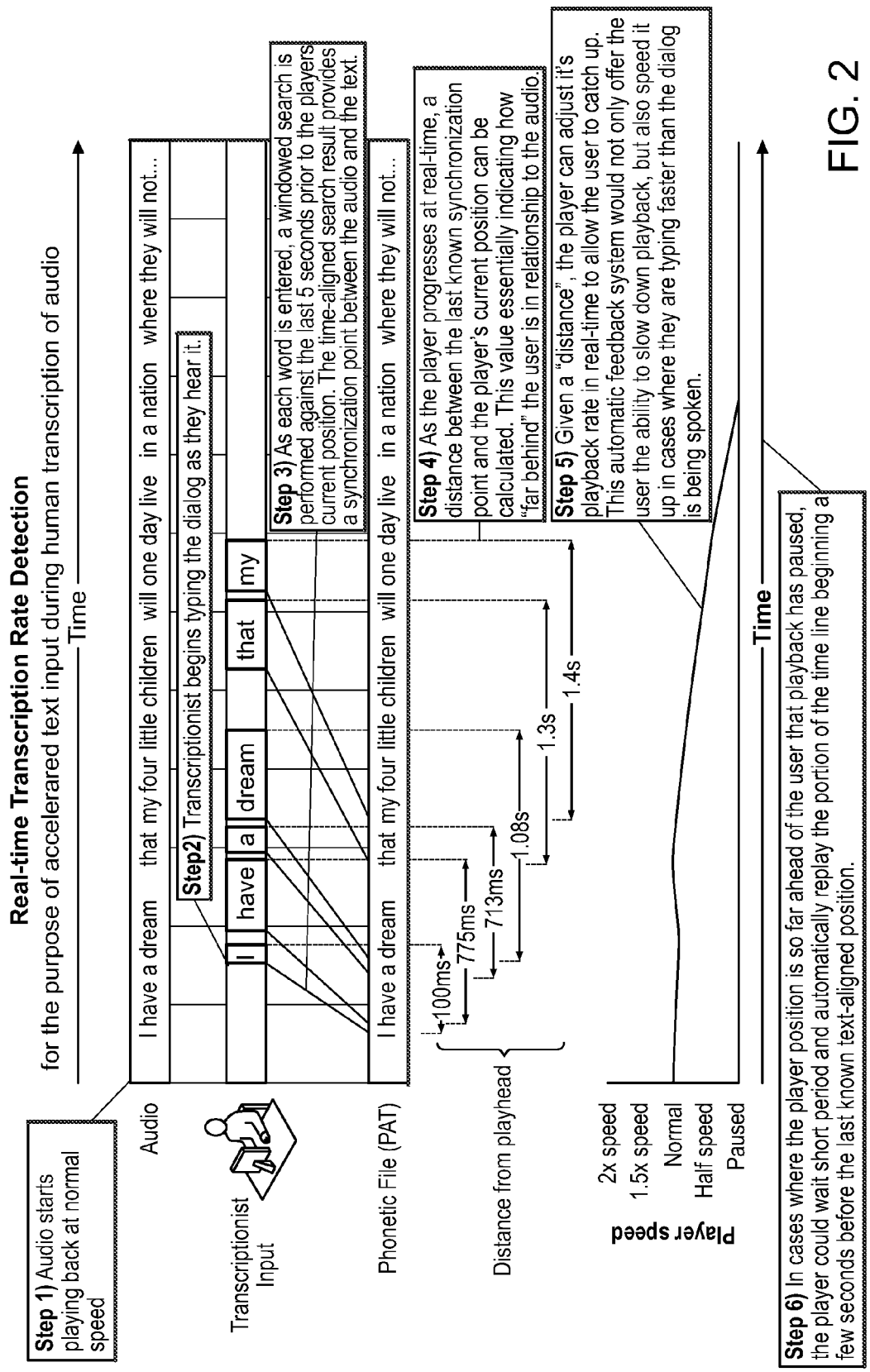
FIG. 2 is an illustration of an automated transcription rate process.

Referring to FIG. 2, an example of an automated transcription rate procedure is illustrated for an example in which the spoken words "I have a dream . . . " are present on the audio recording. The procedure is illustrated as follows:

Step 1: Audio starts playing at normal speed

Step 2: The user (transcriptionist) begins typing the dialogue as they hear it.

Step 3: As each word in entered, a windowed search is performed against the last 5 seconds prior to the player's current position. The time-aligned search result process a synchronization point between the audio and the text.

Step 4: As the player progresses at real time, a distance (keyboard delay) between the last known synchronization point and the player's current position is calculated. This value essentially indicates how "far behind" the user is in relation to the audio.

Step 5: Given a "distance", the player adjusts its playback rate (i.e., the speed control adjust the player's speed) to allow the user to catch up. This automatic feedback system not only offers the user the ability to slow down playback, but also to speed it up in cases where they are typing faster than the dialogue is being spoken.

Step 6: In cases where the player position is so far ahead of the user and the playback is paused, in some versions the player waits for a short period and automatically replay the portion of the timeline beginning a few seconds before the last known text-aligned position.

Another automated feature that can be used in conjunction with, or independently of, the automatic playback speed control relates to presenting predicted words to enable the user to accept words rather than having to type them completely.

There are two sources of information for the prediction. First, the transcription up to a current point in time provides a history that can be combined with a statistical language model to provide likely upcoming words. The second source of information is the upcoming audio itself, which can be used to determine whether the predicted upcoming words are truly present with a reasonably high certainty. One way of implementing the use of these two sources of information is to first generate a list of likely upcoming words, and then to perform a windowed wordspotting search to determine whether those words are truly present with sufficiently high certainty to be presented to the user as candidates. Other implementations may use a continuous speech recognition approach, for example, generating a lattice of possible upcoming word from the upcoming audio that has not yet been heard by the transcriptionist. Such a procedure may be implemented, for example, by periodically regenerating a lattice or N-best list, or pruning a recognition lattice or hypothesis stack based on the transcribed (i.e., verified) words as the user types them.

Figure 3:
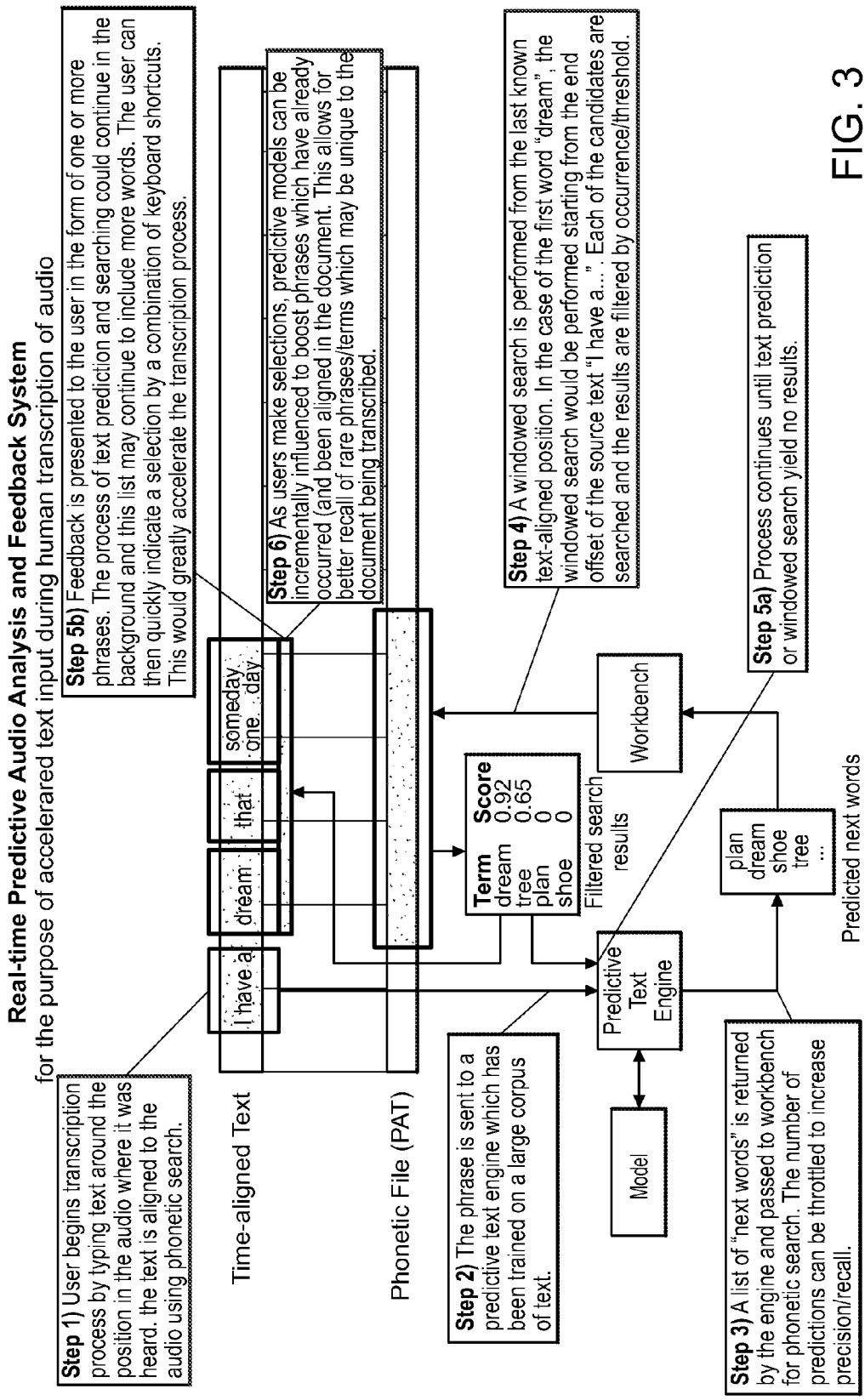
FIG. 3 is an illustration of a predictive text transcription process.

Referring to FIG. 3, an example of a predicted text transcription procedure is illustrated for the example in which the spoken words "I have a dream . . . " are present on the audio recording. The procedure is illustrated as follows:

Step 1: The user begins the transcription process by typing text around the position in the audio where it was heard. The text is aligned to the audio, for example, using the audio search process as described above.

Step 2: The phrase entered by the user is sent to a predictive text engine, for example, which has been statistically trained on a large corpus of text.

Step 3: A list of "next words" is returned from the predictive text engine and passed to the phonetic search module. In some implementations, the number of predictions can be adjusted to vary the precision/recall tradeoff Step 4: A windowed search is performed from the last known text-aligned position. In the case of the first word "dream," the windowed search would be performed starting from the end of the offset of the source text "I have a . . . " . Each of the candidates are searched and the results are filtered by occurrence/threshold.

Step 5a: The process continues until text prediction or windowed search yield no results.

Step 5b: Feedback is presented to the user in the form of one or more phrases. In some versions, the process of text prediction and searching continues in the background and this list may continue to include more words. The user can quickly indicate a selection, for example, by a combination of keyboard shortcuts, which may greatly accelerate the transcription process.

In some examples, the prediction of upcoming words makes use of dictionary-based word completion in conjunction or independent of processing of upcoming audio. For example, consider a situation in which the user has typed "I have a dream". The text prediction unit has identified "that one day", which is found in the audio. Since the system knows the end position of "that one day" in the audio and the system is relatively certain that it occurs, the system optionally processes the audio just beyond that phrase for a hint as to what occurs next. Using an N-best-phonemes approach, the system maps the next phoneme (or perhaps 2-3 phonemes) to a set of corresponding characters. These characters could then be sent back to the text prediction unit to see if it can continue expanding. In this example, the next phonemes after "that one day" might be "_m" which maps to the character "m". This is sent to the text-prediction engine and a list of words beginning with "m" is returned. The word "my" is found in the audio and then the suggested phrase presented to the user is now "that one day my". This process can be repeated.

Figure 4:
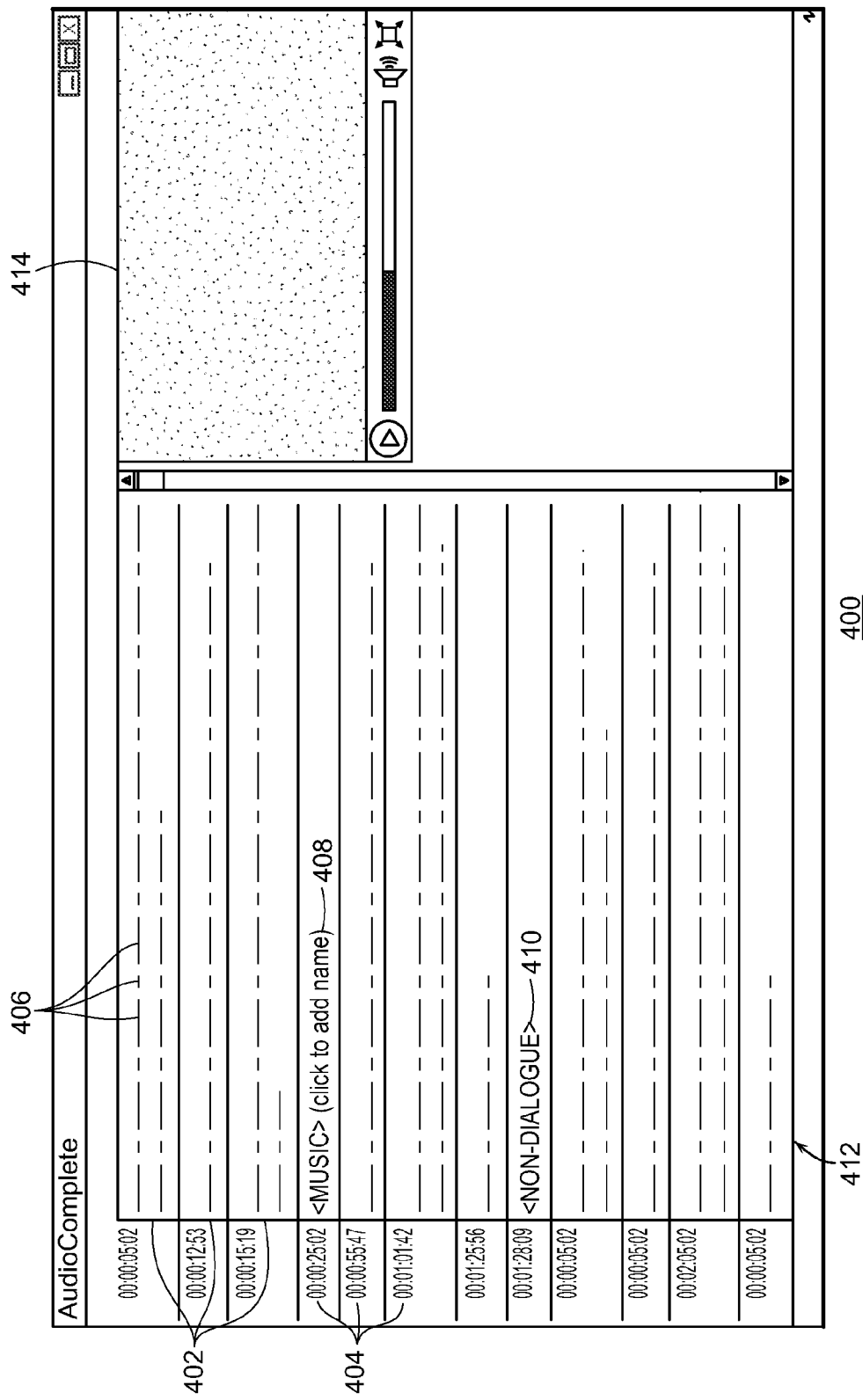
FIG. 4 is a graphical user interface including a transcription template.

Referring to FIG. 4, in some examples, a visualization presented to the user represents the structure of the transcript as a "template" rather than a blank page. Through the use of various detectors (voice activity, silence, music, etc), the template is broken up into logical sections. Visualizing the transcript as a complete document can help the transcriptionist have a view of the context of the audio without actually knowing what is spoken in the audio.

Such a visualization is provided by a user interface 400 that can be provided as a front end to the transcription system described above. A transcriptionist can view the graphical user interface 400 on a display monitor and interface with the graphical user interface 400 using, for example, a keyboard and a mouse. One example of a graphical user interface 400 for transcribing an audio signal includes a transcription template 412 and a media player 414 which can be configured play back an audio or video signal to the transcriptionist. The transcription template 412 includes a sequence of "blocks" 402, each block associated with a timestamp 404 that indicates the time in the audio signal associated with the beginning of the block 402. Each block 402 has a time duration which is defined as the amount of time between the block's 402 timestamp 404 and a significantly long break in voice activity following the block's 402 timestamp 404. The time boundaries of the blocks 402 are determined by applying, for example, a voice activity detector on the audio signal. The voice activity detector monitors voice activity in the audio signal and when it detects a significant break in voice activity (e.g., >1 sec. of silence), the current block 402 is ended. A new block 402 beings when voice activity resumes.

At least some of the blocks 402 include a number of textual placeholders 406. Each textual placeholder 406 in a block 402 represents a word or phrase that is present in the audio signal. The combination of all of the textual placeholders 406 within the block 402 represents a textual structure of dialogue present in the audio signal over the duration of the block 402. In some examples, the textual placeholders 406 are displayed on the graphical user interface 400 as underscores with a length that indicates the estimated duration in time of a word or phrase represented by the textual placeholder 406.

The textual placeholders 406 are identified by detecting pauses between words and/or phrases in the audio signal. In some examples, the pauses are detected by identifying segments of silence that are smaller than those used to identify the boundaries of the blocks 402 (e.g., 200 ms. of silence). In other examples, an N-best-path approach can be used to detect pau (pause) phonemes in the audio signal.

In some examples, different types of blocks 402 can be used. For example, a music detection algorithm can be used to indicate portions of the audio signal that are musical (i.e., non-dialogue). The graphical user interface 400 can display a <MUSIC> block 408 that indicates a start time and duration of the music. A user of the graphical user interface 400 can edit metadata for the music block by, for example, naming the song that is playing.

Another type of block 402, a <NON-DIALOGUE> block 410 can indicate silence and/or background noise in the audio signal. For example, the <NON-DIALOGUE> block 410 may indicate a long period of silence, or non-musical background noise such as the sound of rain or machine noise.

In some examples, if the audio signal includes the dialogue of multiple speakers, a speaker identification or change detection algorithm can be used to determine which speaker corresponds to which dialogue. Each time the speaker detection algorithm determines that the speaker has changed, a new block 402 can be created for that speaker's dialogue.

In some examples advanced detectors like laughter and applause could also be used to further create blocks 402 that indicate key points in the audio signal.

In operation, when an audio signal is loaded into the transcription system, underlying speech recognition and wordspotting algorithms process the audio signal to generate the transcription template 412. The template 412, in conjunction with the previously described automatic control of audio signal playback speed can assist a transcriptionist in efficiently and accurately transcribing the audio signal. For example, as the transcriptionist listens to the audio signal and enters words into the graphical user interface 400, the appropriate textual placeholders 406 are filled with the entered text.

In some examples, the words or phrases entered by the transcriptionist can be compared to a predicted word that is the result of the underlying speech recognition or wordspotting algorithms. If the comparison shows a significant difference between the predicted word and the entered word, an indication of a possible erroneous text entry can be presented to the transcriptionist. For example, the word can be displayed in bold red letters.

In other examples, the transcriptionist may neglect to enter text that corresponds to one of the textual placeholders 406. In such examples, the textual placeholder 406 may remain unfilled and an indication of a missed word can be presented to the transcriptionist. For example, the underscore representing the textual placeholder 406 can be displayed as a bold red underscore. Conversely, if a transcriptionist enters text that does not correspond to any textual placeholder 406, the graphical user interface 400 can display the entered text as bold red text without any underscore, indicating that the entered text may be extraneous.

The transcriptionist using the graphical user interface 400 can revisit portions of the transcription template 412 that are indicated as possible errors and correct the entered text if necessary. For example, the transcriptionist can use a pointing device to position a cursor over a portion of entered text that is indicated as erroneous. The portion of the audio signal corresponding to the erroneous text can then be replayed to the transcriptionist. Based on the replayed portion of the audio signal, the transcriptionist can correct the erroneous text or indicate to the graphical user interface 400 that the originally entered text is not erroneous.

Figure 5:
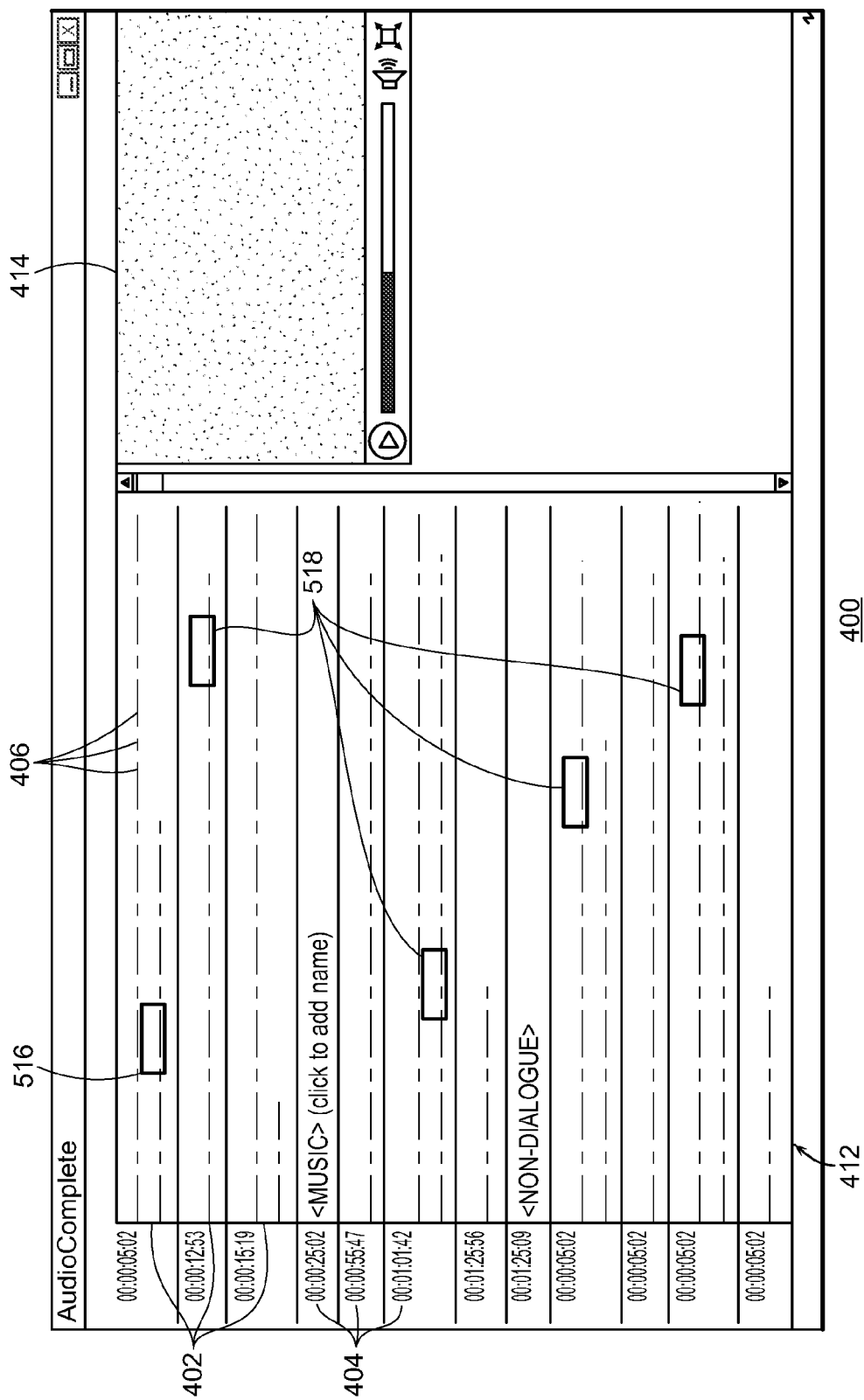
FIG. 5 is a graphical user interface configured to automatically fill in textual placeholders.

Referring to FIG. 5, another example of a graphical user interface 400 is similar to the graphical user interface of FIG. 4. An audio signal is analyzed by underlying speech processing and wordspotting algorithms, producing a number of blocks 402 which include textual placeholders 406.

In this example, as a transcriptionist is transcribing the audio, the underlying speech processing and wordspotting algorithms are configured to continually look ahead to identify words or phrases (e.g., using a phonetic search) that are present at multiple locations in the audio signal and fill in the textual placeholders 406 of the transcript which contain those words or phrases. For example, a word associated with a first textual placeholder 516 may also be associated with a number of subsequent textual placeholders 518. Thus, when a transcriptionist enters text for the word into the first textual placeholder 516, each subsequent textual placeholder 518 is populated with the text entered by the transcriptionist. In some examples, errors can be avoided by considering only long words (e.g., 4 or more phonemes) and/or with high phonetic scores. For longer phrases (or out of vocabulary phrases) this could help accelerate the transcription process.

This concept can also apply to portions of the audio signal that do not include dialogue. For example, a music detector can detect that multiple instances of a clip of music are present in the audio signal. The graphical user interface 400 represents each of the instances of the clip of music as a <MUSIC> block 408 in the template 412. When a user of the graphical user interface 400 updates metadata associated with one of the <MUSIC> blocks 408 (e.g., the name of a song), the graphical user interface 400 can automatically update all instances of that <MUSIC> block with the same metadata. In some examples, a <MUSIC> block, including metadata can be stored in a clip-spotting catalog and can be automatically used when the same <MUSIC> block is identified in future transcript templates 412.

Figure 6:
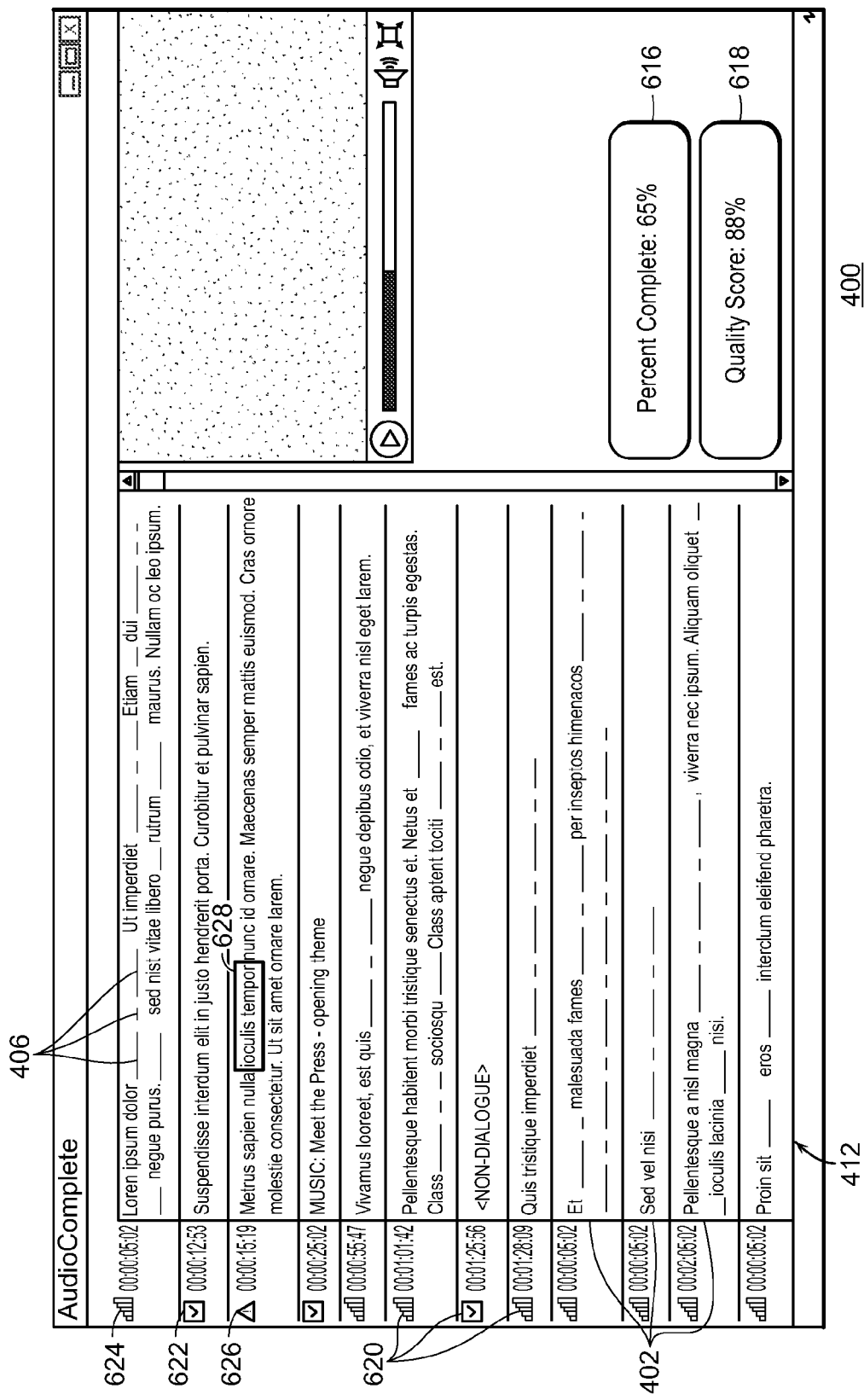
FIG. 6 is a graphical user interface configured to enable automated transcription that includes human input.

Referring to FIG. 6, a graphical user interface 400 utilizes a combination of an underlying speech to text (STT) algorithm and human input to transcribe an audio signal into textual data. In some examples, the STT algorithm is trained on a restricted dictionary that contains mostly structural language and a limited set of functional words. The STT algorithm can use out-of-grammar (OOG) or out-of-vocabulary (OOV) detection to avoid transcribing words that the algorithm is not sure of (e.g., the word has a low phonetic score).

The result of the STT algorithm is a partially complete transcript including textual placeholders 406 for words or phrases that were not transcribed by the STT algorithm. It is then up to a transcriptionist to complete the transcript by entering text into the textual placeholders 406. In some examples, the transcriptionist can use an input device to navigate to an incomplete textual placeholder 406 and indicate that they would like to complete the textual placeholder 406. In some examples, the user interface 400 then plays the portion of the audio signal associated with the textual placeholder 406 back to the transcriptionist, allowing them to transcribe the audio as they hear it. If the STT algorithm has a reasonable suggestion for the text that should be entered into the textual placeholder 406, it can present the suggestion to the transcriptionist and the transcriptionist can accept the suggestion if it is correct.

In some examples, the graphical user interface 400 can present indicators of the completeness and quality 616, 618 of the transcription to the transcriptionist. For example, the indicator of transcription completeness 616 can be calculated as a percentage of the words or phrases included in dialogue blocks 402 that have been successfully transcribed. For example, if 65% of the dialogue in the dialogue blocks 402 is transcribed and 35% of the dialogue is represented as textual placeholders 406, then the completeness indicator would be 65%. The quality indicator 618 can be determined by analyzing (e.g., by a phonetic search) each word or phrase in the incomplete transcript generated by the STT algorithm. In some examples, an overall quality score is generated for each block 402 of dialogue and the overall quality indicator 618 is calculated as an average of the quality score of each block 402. The quality indicator 618 can include coverage percentage, phonetic score, etc.

In addition to the quality and completeness indicators 616, 618, a number of other visual indicators can be included in the graphical user interface 400. For example, each block 402 may have a status marker 620 associated with it to enable transcriptionists to quickly determine the transcription status of the block 402. If a block 402 is complete (e.g., no incorrect words and no incomplete textual placeholders 406), a check mark 622 may be displayed next to the block 402. If a block 402 includes incomplete textual placeholders 406, an indication of how much of the block has been transcribed such as a signal strength icon 624 (e.g., similar to that seen on a cell phone) can be displayed next to the block 402. If a block 402 includes words or phrases that may be incorrectly transcribed, a warning symbol 626 (e.g., an exclamation point) can be displayed next to the block 402 and the words or phrases in question can be indicated (e.g., by color, highlighting, etc.) 628.

In some examples, closed captioning, non-speech events are captured and presented to a viewer. As a pre-process to transcription, these detectors could "decorate" the transcript template (see above). This information would be valuable to the transcriptionist to get a bigger picture of what's in the audio.

In some examples, the transcription system can use combined audio/video data to transcribe the audio. For example, the audio signal is analyzed to separate speakers and the video signal is analyzed to separate faces. Each speaker is automatically represented as "Speaker #1", "Speaker #2", etc. Each face is automatically represented as "Face #1", "Face #2", etc. The system analyzes the overlapping occurrences of faces/speakers to suggest which face might be speaking. This correspondence can then be used to identify dialogue which is happening off-screen. Even without identifying the speakers or faces, this information could be valuable to those reviewing the content. As the user identifies faces and/or speaker, the system could begin suggesting who is speaking based on the statistics between what speaker is being heard and what faces are on screen during that time. As the user "accepts" or "rejects" these suggestions, statistical models can be influenced to increase accuracy of future suggestions. At any point even prior to the user accepting suggestions, the mapping between faces and speakers can be used to provide additional information to the user.

In some examples, the system uses the graphical user interface 400 to present suggested words to the transcriptionist as they type. For example, the word that the system determines is most likely to occupy a textual placeholder 406 could be presented to the user in gray text as they type. To accept the suggested word, the user could hit a shortcut key such as the "Enter" key or the "Tab" key. If the user disagrees with the system's suggestion, they can continue typing and the suggestion will disappear.

In other examples, the system uses the graphical user interface 400 to present a list of suggested words to the transcriptionist as they type. The transcriptionist can use an input device such as a keyboard or mouse to select a desired word from the list or continue typing to type a different word.

In some examples, the transcription system can detect missing words and/or words that are entered in an incorrect order. For example, if a transcriptionist were to enter the text "dream I have a," the transcription system could analyze all permutations of the words in the text to come up with the most likely combination of the words in the text: "I have a dream."

In some examples, previously completed transcripts can be used to influence or train the language model that is used to automatically process an audio signal.

The approach described above may be implemented in hardware and/or in software, for example, using a general purpose computer processor, with the software including instructions for the computer processor being stored on a machine-readable medium, such as a magnetic or optical disk.

It is to be understood that the foregoing description is intended to illustrate and not to limit the scope of the invention, which is defined by the scope of the appended claims. Other embodiments are within the scope of the following claims.

What is claimed is:

1. A transcription system comprising:
   a computer implemented playback unit for playing an audio recording to a user at a controlled playback rate;
   a computer implemented keyboard unit, including an input device for accepting transcribed word input from the user;
   a word spotter configured to receive transcribed words accepted at the input device of the keyboard unit, locate the transcribed words in the audio recording, and estimate corresponding audio times of the transcribed words in the audio recording; and
   a computer implemented playback control unit configured to
   (a) repeatedly determine a keyboard delay, the keyboard delay representing a difference between an audio time of the word and a current position of the playback unit, and
   (b) control a playback rate of the audio recording according to the determined keyboard delay and a predetermined target delay, including controlling the playback rate to match the keyboard delay to the predetermined target delay, the controlling including slowing down the playback rate when the keyboard delay is greater than the target delay and increasing the playback rate when the keyboard delay is less than the target delay.

2. A method for controlling a transcription system comprising:
   playing an audio recording to a user at a controlled rate;
   accepting transcription of the audio recording from the user including accepting transcribed words;
   determining a correspondence of the accepted transcription and the audio recording including locating, by a word spotter, the transcribed words in the audio recording;
   determining a keyboard delay for an accepted transcribed word, the keyboard delay representing a difference between a playback time of the word and a current playback position of the audio recording, said playback time being determined according to the locating of the transcribed words in the audio recording determined by the word spotter; and
   controlling a playback rate according to the keyboard delay and a predetermined target delay, including applying a feedback approach to control playback of the audio recording to match the keyboard delay to the predetermined target delay, the controlling including both increasing and decreasing the playback rate according to the keyboard delay and the target delay.

3. The method of claim 2 wherein locating the words includes applying a wordspotting approach.

4. The method of claim 3 wherein applying the wordspotting approach includes using a stored phonetic processing of the audio recording determined prior to the playing of the recording.

5. The method of claim 2 wherein controlling the playback rate includes at least one of pausing the playback and rewinding the playback according to the determined delay.

6. The method of claim 2 further comprising:
providing a predicted transcription to the user based on a speech recognition of following audio in an interval following a recording time corresponding to a transcription input from the user.

7. The method of claim 6 wherein providing the prediction includes predicting words from the transcription, and determining whether the words are present in the following audio.

8. The method of claim 7 wherein determining whether the words are present includes applying a wordspotting approach.

9. The method of claim 6 wherein providing the prediction include providing multiple alternative predictions for selection by the user.

10. The method of claim 7 further comprising providing a graphical representation of the predicted transcription to the user and updating the graphical representation based on the determination of whether the words are present in the following audio.

11. The method of claim 1 further comprising:
providing a predicted transcription to the user based on a speech recognition of following audio in an interval following a recording time corresponding to a transcription input from the user.

12. The method of claim 11 wherein providing the predicted transcription includes predicting selected words from the transcribed words, and determining whether the selected words are present in the following audio.

13. The method of claim 12 wherein determining whether the selected words are present includes applying a wordspotting approach.

14. The method of claim 11 wherein providing the predicted transcription include providing multiple alternative predictions for selection by the user.

15. The method of claim 12 further comprising providing a graphical representation of the predicted transcription to the user and updating the graphical representation based on the determination of whether the words are present in the following audio.

* * * * *